Patented Nov. 30, 1943

2,335,237

UNITED STATES PATENT OFFICE 2,335,237

AMINO - HYDROXYNAPHTHALENE SULPHONIC ACIDS OR THEIR N-SUBSTITUTION PRODUCTS AND A PROCESS FOR MAKING THE SAME

Achille Conzetti, Basel, Switzerland, assignor to J. R. Geigy A. G., Basel, Switzerland, a firm No Drawing. Application September 18, 1941, Serial No. 411,404. In Switzerland October 10, 1940

5 Claims. (Cl. 260—509)

Hitherto no technical processes were known for nitrating acylated hydroxynaphthalene monosulphonic acids and for producing aminohydroxynaphthalene sulphonic acids from the nitro compounds. It has been found that technically only useless products are obtained by nitrating and subsequently reducing 1-acyloxynaphthalene-4- or -5-sulphonic acids and 2-acyloxynaphthalene-6-, -7- and -8-sulphonic acids by reason either of the quality or of the insufficient yield of the compounds formed.

Surprisingly it has now been found that by nitrating and subsequently reducing from the acyl derivatives of 2-hydroxynaphthalene-4-sulphonic acid, a mixture of 1-amino-6-hydroxynaphthalene-8-sulphonic acid and 1-amino-7-hydroxynaphthalene-5-sulphonic acid can be obtained in a very good yield and in a very pure form. Alkyl carbonic acid esters of 2-hydroxynaphthalene-4-sulphonic acid (carbomethoxy, carboethoxy, carbo-isoamyloxy derivatives and so forth), which are particularly suitable, because they are capable of being isolated by salting out from the aqueous solution of the reaction mixtures from halogencarbonic acid alkyl esters and 2-hydroxynaphthalene-4-sulphonic acid in very high yield, are used with advantage for the nitration. The nitration takes place very smoothly and in a definiate manner so that at the end a mixture of well crystallising aminohydroxynaphthalene sulphonic acids in a yield up to 80% can be obtained. The sodium salts can be separated practically quantitatively by reason of their different solubilities in water.

The proof of constitution for both, previously unknown amino-hydroxynaphthalene sulphonic acids is obtained as follows:

The sodium salt, difficultly soluble in water, of one of the two new amino-2-hydroxynaphthalene-4-sulphonic acids produces 1-amino-6-hydroxynaphthalene of melting point 185° C., N-acetyl compound, melting point 215° C., by reductive splitting off of the sulphonic acid group.

The sodium salt, easily soluble in water, of the second amino - 2 - hydroxynaphthalene-4-sulphonic acid leads, after the same reaction, to 1-amino-7-hydroxynaphthalene of melting point 205–207° C., N-acetyl compound, melting point 165° C.

Consequently the two new amino-2-hydroxynaphthalene-4-sulphonic acids possess the following constitutions:

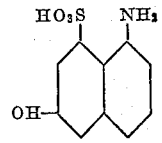

1-amino-6-hydroxynaphthalene-8-sulphonic acid, difficultly soluble sodium salt, scarcely fluoresces in aqueous solution

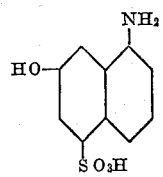

1-amino-7-hydroxynaphthalene-5-sulphonic acid, easily soluble sodium salt, fluoresces intensely green in aqueous solution The new amino-hydroxynaphthalene sulphonic acids form two series of azo dyestuffs depending on whether the coupling is effected in acid or alkaline solution. In addition to the direct production of cotton or wool dyestuffs they are also adapted to serve for the production of new intermediate products, as for example of acylated, alkylated, arylated derivatives and so on. The corresponding hydroxy-naphthostyril can be produced easily by the usual process from 1-amino-6-hydroxynaphthalene-8-sulphonic acid.

The present invention is illustrated by the following example.

EXAMPLE 177 kg. of 2-carbomethoxy-hydroxynaphthalene-4-sulphonic acid, of 82 per cent strength (produced from 2-hydroxynaphthalene-4-sulphonic acid, preferably used in the form of the solution obtained on production, and chlorocarbonic acid methyl ester with 96 per cent of yield) are introduced, as sodium salt, at 0–3° C. into 1000 kg. of sulphuric acid monohydrate and then 66.15 kg. of $HNO_3$—$H_2SO_4$ mixture (50% $HNO_3$ 100 per cent) are allowed to flow in during several hours at the same temperature. Stirring is effected for 12 hours, then the nitrating mass is allowed to flow on ice, heated to 90° C., treated with calcium carbonate, filtered, the precipitate is thoroughly washed and the filtrate evaporated to a volume of about 800 liters. The sodium salt is then produced with sodium carbonate and filtered from the separated calcium carbonate.

After it has been made acid to litmus by means of hydrochloric acid, the solution of the salts is then allowed to flow whilst heating and thoroughly stirring into a suspension of 150 kg. of iron filings in 500 liters of water and 30 liters of 85 per cent strength acetic acid. When the reduction has been completed the dissolved iron is precipitated with sodium carbonate, the whole clarified and the filtrate made acid to Congo red with hydrochloric acid. The mixture of the new aminonaphthol sulphonic acids crystallises already whilst hot. After cooling filtering is carried out.

The press cakes contain about 95–97 kg. of a mixture of amino-2-hydroxynaphthalene-4-sulphonic acids, 100%, molecule 239. In the mother liquor it is still possible to titrate with nitrite about 12 kg. of 100 per cent compound, calculated to the molecule 239, but nothing unitary can be isolated.

When, on the contrary, it is desired to isolate the mixture of nitro-2-hydroxynaphthalene-4-sulphonic acids, the solution of the sodium salts is evaporated to a volume of 400 liters and made strongly acid to litmus with acetic acid. On cooling, the mixture of the nitro-2-hydroxynaphthalene-4-sulphonic acids crystallises in a yield of 85 per cent in yellow thick needles.

Instead of the 2-carbomethoxy-hydroxynaphthalene-4-sulphonic acid there may be used equally well the corresponding 2-carbethoxy- or 2-carboisoamyloxy-compound.

Separation 230 kg. of the mixture of amino-2-hydroxynaphthalene-4-sulphonic acids (molecule 239) are dissolved, when alkaline to litmus, in 2250 liters of water at 85° C. with approximately 115 kg. of 32 per cent caustic soda lye and allowed to cool without stirring. The difficultly soluble sodium salt of 1-amino-6-hydroxynaphthalene-8-sulphonic acid crystallises out even in the heat in thick needles.

Yield about 120 kg. 100% molecule 239.

From the filtrate 1-amino-7-hydroxynaphthalene-5-sulphonic acid is obtained by acidifying.

Yield about 96–98 kg. 100% molecule 239.

Instead of 2-carboalkoxy-hydroxynaphthalene-4-sulphonic acids other acyl derivatives may be used for nitration such as the acetyl, propionyl, benzoyl, benzosulphonyl, toluene sulphonyl compounds and the like.

The isolated aminohydroxynaphthalene sulphonic acids can be converted by known methods into their derivatives substituted in the amino group.

1-carbomethoxy-amino-6-hydroxynaphthalene-8-sulphonic acid:

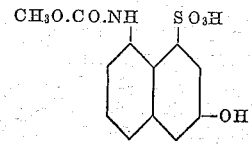

23.9 kg. of 1-amino-6-hydroxynaphthalene-8-sulphonic acid are dissolved, neutral to litmus, in water with sodium carbonate, 16.2 kg. of crystallised sodium acetate (=120% of the theoretical) are added thereto, the solution made acid to litmus with a little dilute acetic acid and whilst vigorously stirring 10.4 kg. of chlorocarbonic acid methyl ester (110% of the theoretical) are dropped in. The temperature increases from 20° C. to 35–40° C. according to the volume of the batch. When test shows complete acylation, there is cooled down to 10° C. and the whole is made neutral to litmus with sodium carbonate. 1-carbomethoxyamino-6-hydroxynaphthalene-8-sulphonic acid cannot be salted out, the solutions are therefore used directly for coupling purposes.

1-benzylamino-7-hydroxynaphthalene-5-sulphonic acid:

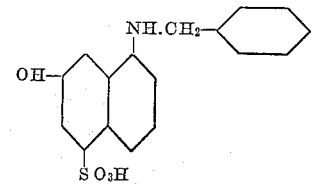

23.9 kg. of 1-amino-7-hydroxynaphthalene-5-sulphonic acid are dissolved neutral to litmus in water and heated under reflux in the presence of 15 kg. of crystalline sodium acetate with 12.6 kg. of benzyl chloride until the diazo reaction of the free amino group has disappeared (duration about 12–15 hours).

When acidifying and salting out the benzyl compound only precipitates partly so that for coupling purposes it is best to use the solutions directly.

By further known methods other derivatives of the new amino-hydroxynaphthalene sulphonic acids can be produced, for example acyl derivatives such as the acetyl, benzoyl, toluene sulphonyl compounds, alkyl and aryl derivatives such as the methyl, ethyl, phenyl compounds and many others.

What I claim is:

1. Process for the manufacture of 1-amino-6-hydroxynaphthalene-8-sulphonic acid and 1-amino-7-hydroxynaphthalene-5-sulphonic acid, which comprises nitrating acyl derivatives of 2-hydroxynaphthalene-4-sulphonic acid, reducing the nitro-2-hydroxynaphthalene-4-sulphonic acids produced and separating the resulting 1-amino-6-hydroxynaphthalene-8-sulphonic acid and the 1-amino-7-hydroxynaphthalene-5-sulphonic acid by salting out the difficulty soluble sodium salt of the 1-amino-6-hydroxynapthalene-8-sulphonic acid.

2. Process for the manufacture of 1-amino-6-hydroxynaphthalene-8-sulphonic acid and 1-amino-7-hydroxynaphthalene-5-sulphonic acid, which comprises nitrating a carboalkoxy derivative of 2-hydroxynaphthalene-4-sulphonic acid, reducing the nitro-2-hydroxynaphthalene-4-sulphonic acids produced and separating the resulting 1-amino-6-hydroxynapthalene-8-sulphonic acid and the 1-amino-7-hydroxynaphthalene-5-sulphonic acid by salting out the difficulty soluble sodium salt of the 1-amino-6-hydroxynaphthalene-8-sulphonic acid.

3. The mixtures of amino-hydroxynaphthalene sulphonic acids of the formula

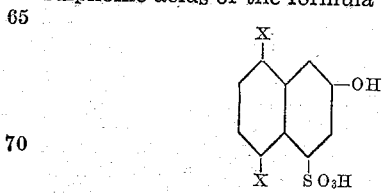

wherein one of the X's is $NH_2$ and the other X is H, being, in the form of the sodium salts, colorless compounds, soluble in water.

4. The 1-amino-6-hydroxynaphthalene-8-sulphonic acid of the formula

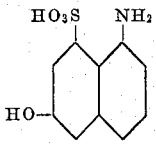

being in the form of the sodium salt a colorless compound, difficulty soluble in water, giving by reductive splitting off of the sulphonic acid group 1-amino-6-hydroxynaphthalene of M. P. 185° C.

5. The 1-amino-7-hydroxynaphthalene-5-sulphonic acid of the formula

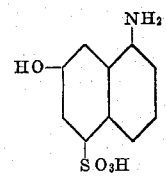

being in the form of the sodium salt a colorless compound, easily soluble in water with intense green fluorescence, giving by reductive splitting off of the sulphonic acid group 1-amino-7-hydroyxnaphthalene of M. P. 205–207° C.

ACHILLE CONZETTI.